US008511558B2

(12) United States Patent
Dariel

(10) Patent No.: US 8,511,558 B2
(45) Date of Patent: Aug. 20, 2013

(54) SMARTCARD POWER MANAGEMENT

(75) Inventor: Dani Dariel, Yishuvel Gederot (IL)

(73) Assignee: SanDisk IL Ltd., Kfar Saba (IL)

( * ) Notice: Subject to any disclaimer, the term of this patent is extended or adjusted under 35 U.S.C. 154(b) by 0 days.

(21) Appl. No.: 11/225,163

(22) Filed: Sep. 14, 2005

(65) Prior Publication Data

US 2006/0226243 A1 Oct. 12, 2006

Related U.S. Application Data

(60) Provisional application No. 60/670,595, filed on Apr. 12, 2005.

(51) Int. Cl.
*G06F 1/26* (2006.01)

(52) U.S. Cl.
USPC .......................................... 235/441; 713/320

(58) Field of Classification Search
USPC ..................... 235/441, 487, 492; 713/320
See application file for complete search history.

(56) References Cited

U.S. PATENT DOCUMENTS

| 5,129,091 A | | 7/1992 | Yorimoto |
| 5,410,714 A | | 4/1995 | Yorimoto |
| 5,544,111 A | * | 8/1996 | Berthozat et al. .......... 365/225.7 |
| 5,777,570 A | * | 7/1998 | Kokubu ........................ 341/173 |
| 5,862,393 A | | 1/1999 | Davis |
| 6,070,804 A | * | 6/2000 | Miyamoto ..................... 235/494 |
| 6,356,738 B1 | * | 3/2002 | Schneider et al. ........... 455/41.2 |
| 6,360,952 B1 | * | 3/2002 | Kimlinger et al. ............ 235/492 |
| 7,185,145 B2 | | 2/2007 | Mizushima et al. |
| 2002/0124178 A1 | * | 9/2002 | Kocher et al. ................. 713/193 |
| 2004/0015774 A1 | * | 1/2004 | Sakai et al. .................... 714/797 |
| 2004/0124246 A1 | * | 7/2004 | Allen et al. .................... 235/492 |
| 2004/0268166 A1 | * | 12/2004 | Farkas et al. .................. 713/320 |
| 2005/0085264 A1 | * | 4/2005 | Matsumura .................... 455/558 |
| 2005/0180068 A1 | * | 8/2005 | Lopata ............................ 361/18 |
| 2005/0210302 A1 | * | 9/2005 | Kato et al. ..................... 713/320 |
| 2005/0240786 A1 | * | 10/2005 | Ranganathan ................ 713/320 |
| 2006/0104120 A1 | * | 5/2006 | Hemink ................... 365/185.28 |

FOREIGN PATENT DOCUMENTS

| JP | 2000-20663 | 1/2000 |
| JP | 2000-137774 | 5/2000 |
| JP | 2001-297316 | 10/2001 |
| JP | 2002-109494 | 4/2002 |
| WO | WO2006/109289 | 10/2006 |

OTHER PUBLICATIONS

International standard ISO/IEC 7816-2+7816-3 Information Technology—Identification cards—Integrated circuit cards with contacts—Dimensions and location of the contacts + Electronic signals and transmission protocols.

(Continued)

*Primary Examiner* — Daniel Hess
(74) *Attorney, Agent, or Firm* — Brinks Hofer Gilson & Lione

(57) ABSTRACT

Portable smartcard devices, methods of operating smartcard devices, systems including a smartcard device and a terminal, and computer readable storage media including instructions for smartcard devices are provided. According to some embodiments, the smartcard includes a controller for executing commands received from a terminal, where execution of at least one command affects a power consumption of the smartcard device during subsequent execution of at least one other command. Optionally, the command which modifies smartcard power consumption is issued by the terminal in accordance with a power consumption decision.

38 Claims, 9 Drawing Sheets

(56) References Cited

OTHER PUBLICATIONS

EPO/ISA, "Notification of Transmittal of the International Search Report and the Written Opinion of the International Searching Authority, or the Declaration," corresponding International Patent Application No. PCT/IL2006/000378, mailed on May 8, 2007, 6 pages.
Notice of Grounds for Rejection, Korean Patent Application No. 10-2007-7026153, dated Oct. 14, 2009, 4 pages.
Office Action issued in Korean Application No. 10-2007-7026153 on May 31, 2010 (4 pgs).
Office Action issued in Japanese Application No. 2008-506047 on Aug. 13, 2010 (4 pgs).
Office Action from corresponding Japanese Appln. No. 2008-506047 dated Jun. 3, 2011 (7 pgs).
Office Action from corresponding Chinese Application No. 200680013635.9 dated Dec. 18, 2009 (22 pgs).
Office Action from corresponding Chinese Application No. 200680013635.9 dated Nov. 23, 2010 (8 pgs).
Office Action issued in corresponding Chinese Appln. No. 200680013635.9 dated Dec. 7, 2011 (9 pgs).
Office Action issued in corresponding Chinese Appln. No. 200680013635.9 dated Apr. 2, 2013 (13 pgs).

* cited by examiner

SMARTCARD POWER MANAGEMENT

CROSS-REFERENCE TO RELATED APPLICATIONS

This patent application claims the benefit of U.S. Provisional Patent Application No. 60/670,595, filed Apr. 12, 2005 by the present inventor.

FIELD OF THE INVENTION

The present invention relates to smartcard devices, and in particular to smartcard power management.

BACKGROUND OF THE INVENTION

Smartcard Devices

Smartcards are electronic devices which may be conveniently carried upon one's person, each of which contains an active internal logic device capable of securely interfacing with and exchanging data with specifically authorized external devices. Smartcards are sometimes referred to as "integrated circuit cards" or "chip cards". Generally, smartcards contain memory, a microcontroller with its associated logic memory, and executable code.

One salient feature of many smartcard devices is that their stored data can be protected against unauthorized access and manipulation by restricting access to an interface that is controlled by operating system and security logic. Confidential data can thus be written to a smartcard and stored in a manner that prevents the data from ever being read by a device external to the smartcard.

The International Standard Organization (ISO) publishes mechanical and electrical specifications for smartcards such as the ISO 7816 group of standards. Smartcards based on the standards for integrated circuit cards generally conform thereto, where applicable, but also include features not necessarily described therein. Smartcards are generally differentiated by the amount of included memory, the Integrated Circuit (IC), capability of handling complex processing, cryptographic scheme, electrical interface, and mechanical layout.

Purposes to which smartcards may be applied include, but are not limited to, public telephony cards, bank cards used in Point-of-Sale (POS) terminals and Automatic Teller Machines (ATMs), Pay TV in set-top boxes, and wireless telecom operators implementing Subscriber Identity Module (SIM) cards in Global System for Mobile (GSM) terminals. SIM cards are of particular interest because of (a) their small form factor, (b) they are put in place only once with the power off, and (c) their commercial importance. With the introduction of the Universal Mobile Telecommunication System (UMTS) as the third-generation (3G) European mobile phone technology, a new version of the SIM card called USIM (UMTS Subscriber Identity Module or Universal Subscriber Identity Module) has been introduced for the UMTS mobile network. USIM cards contain relevant information for enabling access to an UMTS-subscribed operator network. Both the SIM card and the USIM card fall within the smartcard category.

The use of smartcards with mobile telephones has been especially significant in promoting the international proliferation of smartcards. GSM phones utilize smartcards as an access medium in part because smartcards allow a high degree of security to be achieved when accessing the mobile telephone network, and also because they provide new possibilities and thus major advantages in marketing mobile telephones, since they enable network operators and service providers to sell telephones and services separately.

FIG. 1A illustrates an example of a prior art smartcard architecture. The card (4) includes a set of pins (1) defined by the ISO standard for connecting to a host system including clock, data signal for data transfer, reset signal, and power pins. A CPU (3) is connected to the pins (1) via a bus interface (2). The CPU (3) has access to an area of ROM (7) that stores executable code, to RAM (5), and an EEPROM component (6) used mainly for storing configurable data (e.g. private encryption keys). For supporting large amounts of data and/or demanding applications, enhanced memory capacity in the form of flash memory may also be provided.

FIG. 1B illustrates the mechanical layout of a prior art ISO-compatible smartcard (41) and the set of eight terminals (40) used to interface with the card. The ISO standard defines only five pins, while the three additional pins are reserved for future use.

FIG. 1C illustrates the physical form factor of a prior art SIM or USIM card.

Besides the ISO interface, other smartcards interfaces have been defined. These additional interfaces usually provide high-speed data transfer, and are mainly for use with high-capacity memory cards. Typical smartcard interfaces include but are not limited to Secure Digital (SD), Multi Media Card (MMC), and wireless/contactless interface. Lately, Universal Serial Bus (USB) has been suggested as another potential interface for smartcards. New interfaces either use the reserved ISO pins or define a new set of pins in addition to or instead of the ISO-standard pins.

Modern smartcard operating systems allow new applications to be uploaded to the card after the card has been issued to the user. The new flexibility afforded by these modern smartcard operating systems opens up completely new application areas. For example, personal security modules, which are indispensable in Internet commerce and payments, are made trustworthy through the use of smartcards. These security modules can securely store personal keys and execute high-performance cryptographic algorithms. Security-related tasks can be performed in an elegant manner by a microprocessor with a cryptographic coprocessor.

The amount of memory provided within smartcards is increasing as new technologies are introduced enabling the production of high-capacity memory on a small die. Memory technology enhancements enable smartcards to support more applications by incorporating high-capacity flash memory on the card itself.

As mobile handsets with increased multimedia capabilities become available, and as service providers begin implementing broadband mobile services, the need for secure, scalable, and configurable high-capacity storage is becoming acute. One example of an enhanced large-capacity (U)SIM card is M-Systems' (Newark, Ca) MegaSIM™ card module. With MegaSIM, (U)SIM card vendors can provide their mobile operator customers with a (U)SIM card enabling a variety of advanced mobile services, such as downloading MMS, MP3, and video clips, full Personal Information Management (PIM) functionality, and high-resolution picture storage.

With the emergence of new applications demanding large amounts of memory, high-end mobile phones have started providing a dedicated interface for memory cards to hold the data required by these applications. Typical applications include integrated cameras that require a large amount of memory to store still pictures and/or video clips, MP3 files, and Multi-Media Messaging Service (MMS) messages. Up until now, memory cards offered megabytes (MB) of memory and (U)SIM cards only kilobytes (KB). With the introduction of MegaSIM containing megabytes of memory, enhanced applications can utilize a (U)SIM card for both legacy use and to store large amounts of data for multimedia devices and applications.

In summary, the emergence of advanced operating systems running on smartcards, and multimedia applications such as digital stills or video pictures (MPEG files), music (MP3 files), games, and the need for higher memory capacity on smartcards opens up a variety of new opportunities to mobile network operators and service providers.

It is noted that while advanced smartcard devices provide enhanced functionality, the power required by these devices is, in many cases, greater than the power required by legacy smartcard devices. Unfortunately, there are a number of situations where the requisite extra power is unavailable.

Smartcard Power Consumption

The Third Generation Partnership (3GPP) organization's GSM 11.18 specifications define the maximum amount of current that may be drawn by a (U)SIM card. According to these specifications, the maximum current that a (U)SIM card draws may not exceed 4 milliamps under normal operating conditions. Many mobile terminals available on the market today enforce this limit and if the (U)SIM card draws excess current, the card is rejected by the terminal and an internal error is generated. With the introduction of new, more advanced (U)SIM cards with enhanced processing power, larger memory capacity and possibly enhanced functionality, 4 milliamps is lower than what practically can be achieved when utilizing the extra functionality. Due to the above-described limitation, use of advanced (U)SIM cards with increased memory capacity and enhanced performance is limited to certain types of terminals that have been designed to support higher power requirements. If an advanced (U)SIM card is inserted into a mobile terminal that has not been designed to provide the higher amount of current required for proper operation, the terminal may reject the (U)SIM card as defective.

There is an ongoing need for smartcard devices that dynamically adjust their power consumption. This added functionality would allow advanced featured-laden smartcards that typically consume a great deal of electrical power to provide compatibility with terminals that strictly regulate a maximum amount of current consumed by the smartcard.

SUMMARY OF THE INVENTION

The aforementioned needs are satisfied by several aspects of the present invention.

It is now disclosed for the first time a power aware smartcard system including a terminal for issuing commands, a smartcard having an interface for presenting smart card functionality to the terminal and a controller for executing the issued commands, and a power consumption decision handling mechanism for handling a power consumption decision for the smartcard. According to some embodiments, at least one command affects a power consumption of the smartcard device during subsequent execution of at least one other command, and the terminal is operative to issue the at least one command in accordance with the power consumption decision.

There is no explicit limitation on the type of power consumption decision effected by and/or handled by the power consumption decision handling mechanism. Thus, exemplary power consumption decisions include but are not limited to a decision to increase a power consumption of the smartcard device, a decision to decrease a power consumption of the smartcard device, and a decision to constrain a maximum power consumption of the smartcard below a given value There is no limitation on the specific implementation of the power consumption decision handling mechanism. In some embodiments, the power consumption decision mechanism resides at least in part in the terminal or in the smartcard. Alternatively or additionally, the power consumption decision mechanism resides at least in part outside of the smartcard-terminal system. It is noted that the "power consumption decision handling mechanism" may reside on a single device or may be disturbed over a number of devices, and may be implemented using any appropriate combination software, hardware, firmware and the like.

Thus, according to some embodiment of the present invention, a set of one or more commands, operative to control the smartcard's current consumption, are added to the card's command portfolio. It is noted that there is no explicit limitation on the syntax of the aforementioned one or commands, and thus there is no requirement that the command includes an explicit reference to a certain power or current level.

There is no specific limitation on how the power consumption decision is made, where the power consumption decision is made or when the power consumption decision is made.

According to one specific example, when an advanced (U)SIM card is powered up it is initialized to consume minimum current to comply with 3GPP GSM 11.18 specifications, making this (U)SIM card compatible all types of mobile terminals. Advanced mobile terminals designed for enhanced functionality and capable of applying more current to the U(SIM) card will issue, for example, a smartcard command to accelerate the card's processing speed. Execution of this command will concomitantly increase the power consumption of the smartcard device, thereby enabling enhanced smartcard performance during subsequent execution of other commands.

Nevertheless, the (U)SIM card remains compatible with standard mobile devices. Thus, although certain enhanced terminals can take advantage of the (U)SIM card's enhanced performance and capabilities by dynamically increasing the (U)SIM card current consumption, other terminals, with more stringent maximum current policies, can operate the smartcard in a mode where smartcard functionality is reduced, for example, by shutting down certain (U)SIM card functional blocks or by reducing the card's processing power.

According to some embodiments, the execution of the at least one command sets an operating parameter of the smartcard device, thereby affecting the power consumption of the smartcard device during the subsequent executing. Alternatively or additionally, the execution of the at least one command enables or disables a functional unit of the smartcard device. Alternatively or additionally, the execution of the at least one command enables or disables at least some memory of the smartcard device. In exemplary embodiments, the enabled or disabled memory includes non-volatile memory such as flash memory.

According to some embodiments, the operating parameter set by the at least one command is set for a limited time for the subsequent executing of the at least one other command.

Alternatively, the operating parameter is set on an ongoing basis as a new operating configuration.

Exemplary operating parameters include but are not limited to a clock frequency and a time of a non-volatile memory operation.

Exemplary functional units to be enabled or disabled include but or not limited to a floating point unit and a cryptographic unit.

It is now disclosed for the first time a portable smartcard device including an interface for receiving commands from a terminal and for presenting smart card functionality to the terminal and a controller for executing the received commands, wherein at least one command is operative to enable or disable a functional unit of the smartcard device.

According to some embodiments, the functional unit remains enabled or disabled during subsequent execution of at least one other command.

It is now disclosed for the first time a portable smartcard device including an interface for receiving commands from a terminal and for presenting smart card functionality to the terminal and a controller for executing the received commands, wherein at least one command is operative to enable or disable at least some memory of the smartcard device.

It is now disclosed for the first time a portable smartcard device including an interface for receiving commands from a terminal and for presenting smart card functionality to the terminal and a controller for executing the received commands, wherein execution of at least command affects a power consumption of the smartcard device during subsequent execution of at least one other command, and the at least one command sets an operating parameter of internal functionality circuitry of the smartcard.

It is now disclosed for the first time a method for operating a smartcard device by a terminal including making a power consumption decision for the smartcard device, in accordance with the power consumption decision, issuing by the terminal to the smartcard device at least one command which affects a power consumption of the smartcard device during subsequent execution of at least one other command, and issuing by the terminal of the at least one other command.

According to some embodiments, the method further includes execution by the smartcard device of the at least one other command.

It is now disclosed for the first time a method for operating a smartcard device by a terminal. The presently disclosed method includes the steps of configuring the smartcard device to receive commands from the terminal (e.g. coupling the smartcard device to the terminal) and issuing by the terminal to the smartcard device at least one command that enables or disables a functional unit of the smartcard device. According to some embodiments, the functional unit remains enabled or disabled during subsequent execution of the at least one other command.

According to some embodiments, the presently disclosed method further includes issuing by the terminal of the at least one other command.

It is now disclosed for the first time a method for operating a smartcard device by a terminal. The presently disclosed method includes the steps of configuring the smartcard device to receive commands from the terminal (e.g. coupling the smartcard device to the terminal) and issuing by the terminal to the smartcard device at least one command that enables or disables at least some memory of the smartcard device.

According to some embodiments, the at least some memory remains enabled or disabled during subsequent execution of the at least one other command.

According to some embodiments, the presently disclosed method further includes issuing by the terminal of the at least one other command.

It is now disclosed for the first time a method for operating a smartcard device by a terminal. The presently disclosed method includes the steps of issuing by the terminal to the smartcard device at least one command that sets an operating parameter of internal functionality circuitry of the smartcard device to affect a power consumption of the smartcard device during subsequent execution of at least one other command, and issuing by the terminal of the at least one other command.

It is now disclosed for the first time computer readable storage medium having computer readable code embodied in the computer readable storage medium, the computer readable code instructions for a smartcard device to receive a plurality of commands from a terminal and to execute at least one command which modifies an enables or disables a functional unit of the smartcard device.

It is now disclosed for the first time computer readable storage medium having computer readable code embodied in the computer readable storage medium, the computer readable code instructions for a smartcard device to receive a plurality of commands from a terminal and to execute at least one command which modifies an enables or disables of at least some memory of the smartcard device.

It is now disclosed for the first time computer readable storage medium having computer readable code embodied in the computer readable storage medium, the computer readable code instructions for a smartcard device to receive a plurality of commands from a terminal and to execute at least one command which sets an operating parameter of internal functionality circuitry of the smartcard to affect the power consumption of the smartcard device during subsequent execution of at least one other command.

These and further embodiments will be apparent from the detailed description and examples that follow.

DETAILED DESCRIPTION OF THE INVENTION

Figure 1A:
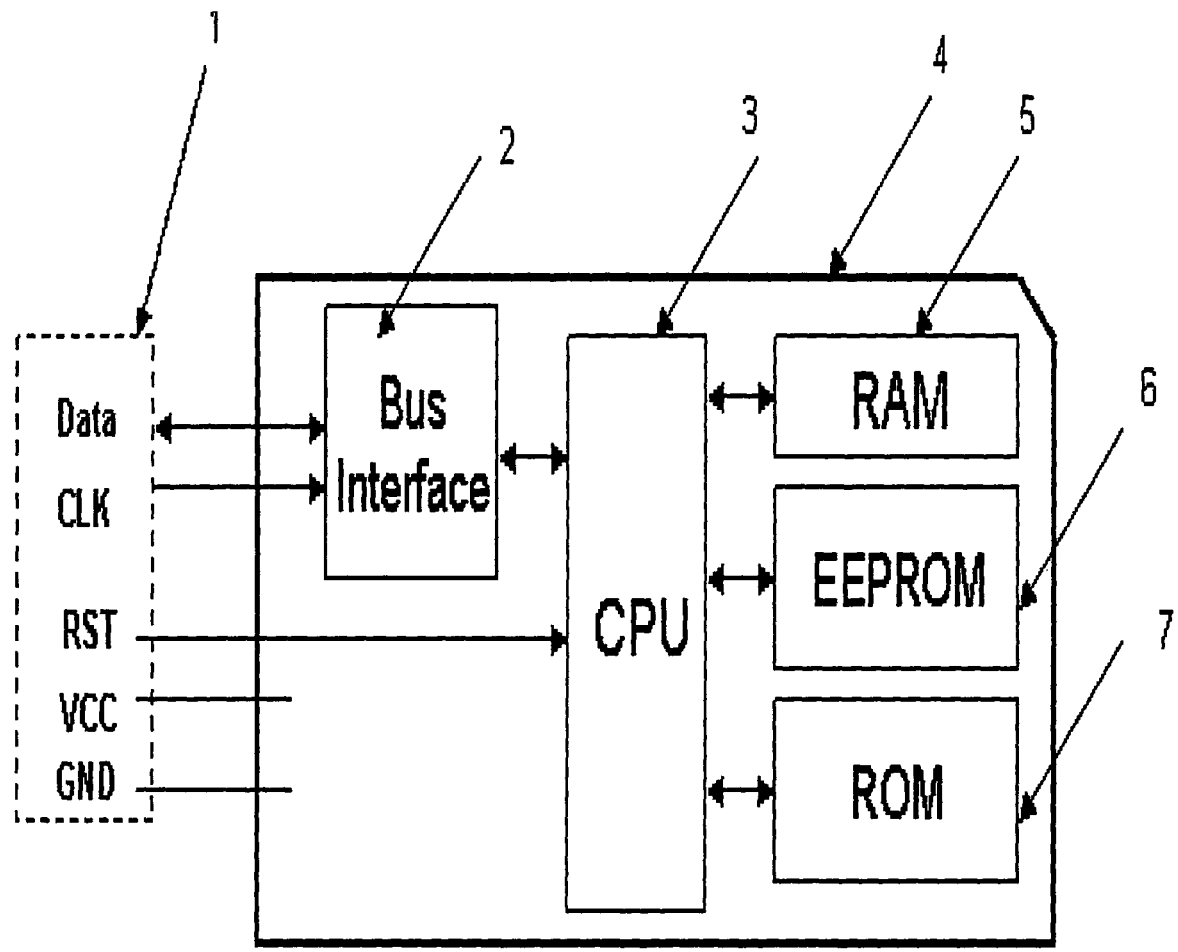
FIG. 1A illustrates an example of smartcard architecture.
Figure 1B:
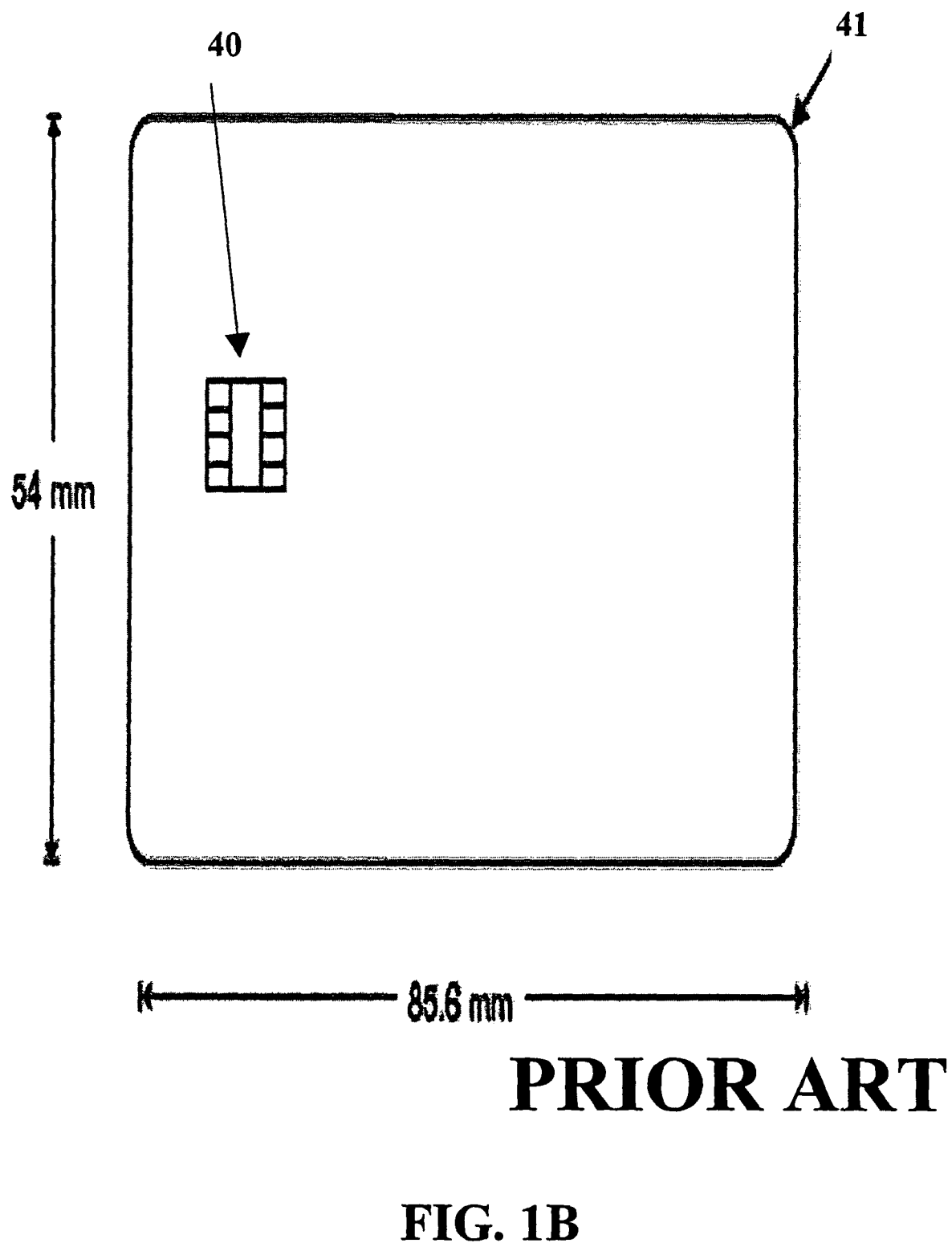
FIG. 1B illustrates the mechanical layout of an ISO-compatible smartcard.
Figure 1C:
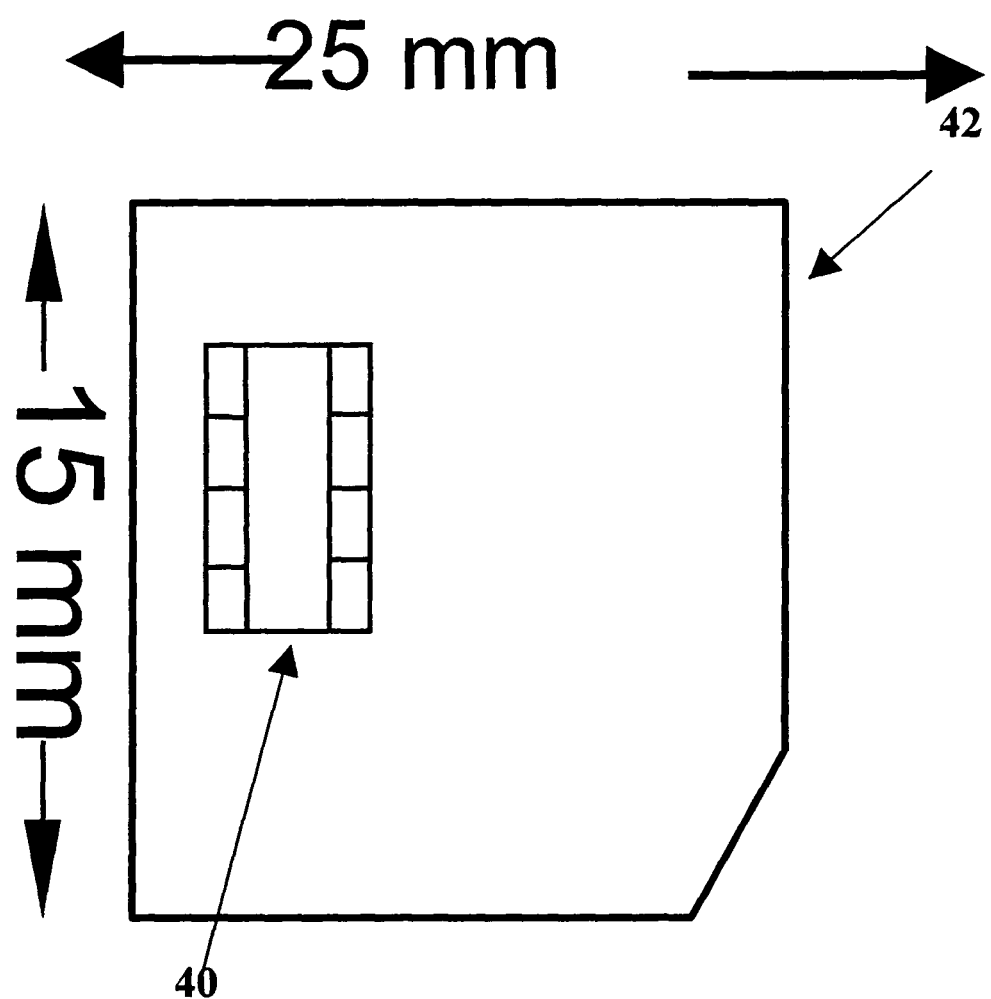
FIG. 1C illustrates the physical form factor of a SIM or USIM card.

The present invention will now be described in terms of specific, example embodiments. It is to be understood that the invention is not limited to the example embodiments disclosed. It should also be understood that not every feature of the smartcard devices, smartcard systems, methods of smartcard power management and computer readable code described is necessary to implement the invention as claimed in any particular one of the appended claims. Various elements and features of devices are described to fully enable the invention. It should also be understood that throughout this disclosure, where a process or method is shown or described, the steps of the method may be performed in any order or simultaneously, unless it is clear from the context that one step depends on another being performed first.

For the purpose of this disclosure a smartcard is any card providing secure access for some data stored within the card. This definition includes, but is not limited to, any card complying with the mandatory portions of the ISO 7816 standard, any SIM card and any USIM card.

For the purpose of this disclosure a terminal is any computing device capable of interfacing with a smartcard. This definition includes, but is not limited to, cellular phones, PDAs, and other types of mobile terminals.

Generally, the smartcard device includes circuitry for supporting the communication between the terminal and the smartcard device (e.g. "interface functionality circuitry"). Furthermore, it is noted that smartcard devices also, in general, includes "internal functionality circuitry" which is circuitry not directly related to communication between the smartcard device and the outside world. For certain configurations and certain examples, internal functionality circuitry can include a device CPU, a floating point or cryptographic unit, and non-volatile (e.g. flash) memory.

Some embodiments of the present invention provide one or more commands whose execution affects a power consumption of the smartcard device during subsequent execution of at least one other command. It is noted that there is no specific limitation on when or how the execution of the one or more commands affects the power consumption of the smartcard device. Thus, in some embodiments, the execution of the one or more commands immediately affects the power consumption of the smartcard device, even for cases where the subsequent execution of the at least one other command occurs at a later time.

In one non-limiting example, shutting down or disabling a cryptographic core causes the power consumption of the smartcard device to drop immediately, without any connection to any subsequent execution of other commands. Later, at a time of subsequent execution of the one or more other commands, the power consumption is lower as a result of the earlier shutting down or disabling of the cryptographic core.

Alternatively, the effect of the execution of the one or more commands on the power consumption of the smartcard device is delayed.

It is noted that in some embodiments, the device does not shut down in between the time of the execution of the "at least one command" and the subsequent execution of the "at least one other command," and remains operative during this time interval.

In some embodiments, a first command of the subsequent "at least one other command" command is the first command executed by the smartcard command after execution of the last command of the "at least one command."

Similarly, some embodiments of the present invention provide one or more commands whose execution enables or disables electronic circuitry such as memory or functional units of the smartcard device, or which alternatively or additionally changes an operating parameter of smartcard circuitry (e.g. internal functionality circuitry). According to some embodiments, the enablement status of the memory or functional unit, or the operating parameter of the smartcard circuitry, is thus changed for subsequent execution of one or more other commands. Nevertheless, it is noted that there is no specific limitation on when or how the memory or functional unit is enabled or disabled, or on when or how the operating parameter is modified.

Certain embodiments of the present invention provide a power consumption decision mechanism for making a decision to increase or decrease a power consumption of the smartcard. There is no limitation on how specifically the decision mechanism decides to increase or power consumption of the smartcard. In one particular non-limiting example, making the power consumption decision includes assessing or estimating a candidate future power consumption of the device for a particular configuration or set of operating parameters, for example from a table, though this is by no means a requirement of the present invention. If the candidate future power consumption would exceed a maximum power consumption allowed by the terminal, a decision to decrease the power consumption of the device is made, and, for example, a command operative to disable smartcard memory or to reduce a clock speed is issued by the terminal to the smartcard. Nevertheless, it is noted that for these embodiments, although a decision is made to reduce the power consumption is made, and although a command whose execution reduces power consumption is issued, the actual command or command syntax does not need to specifically relate to power consumption.

Some embodiments of the present invention relate to making or handling a power consumption decision. According to some embodiments, the "handling" of a power consumption decision includes actually making the power consumption decision. According to some embodiments, handling a power consumption decision includes making a decision to issue a command to a smartcard, or a decision to refrain from issuing a command to a smartcard, in accordance with power consumption considerations.

Figure 2:
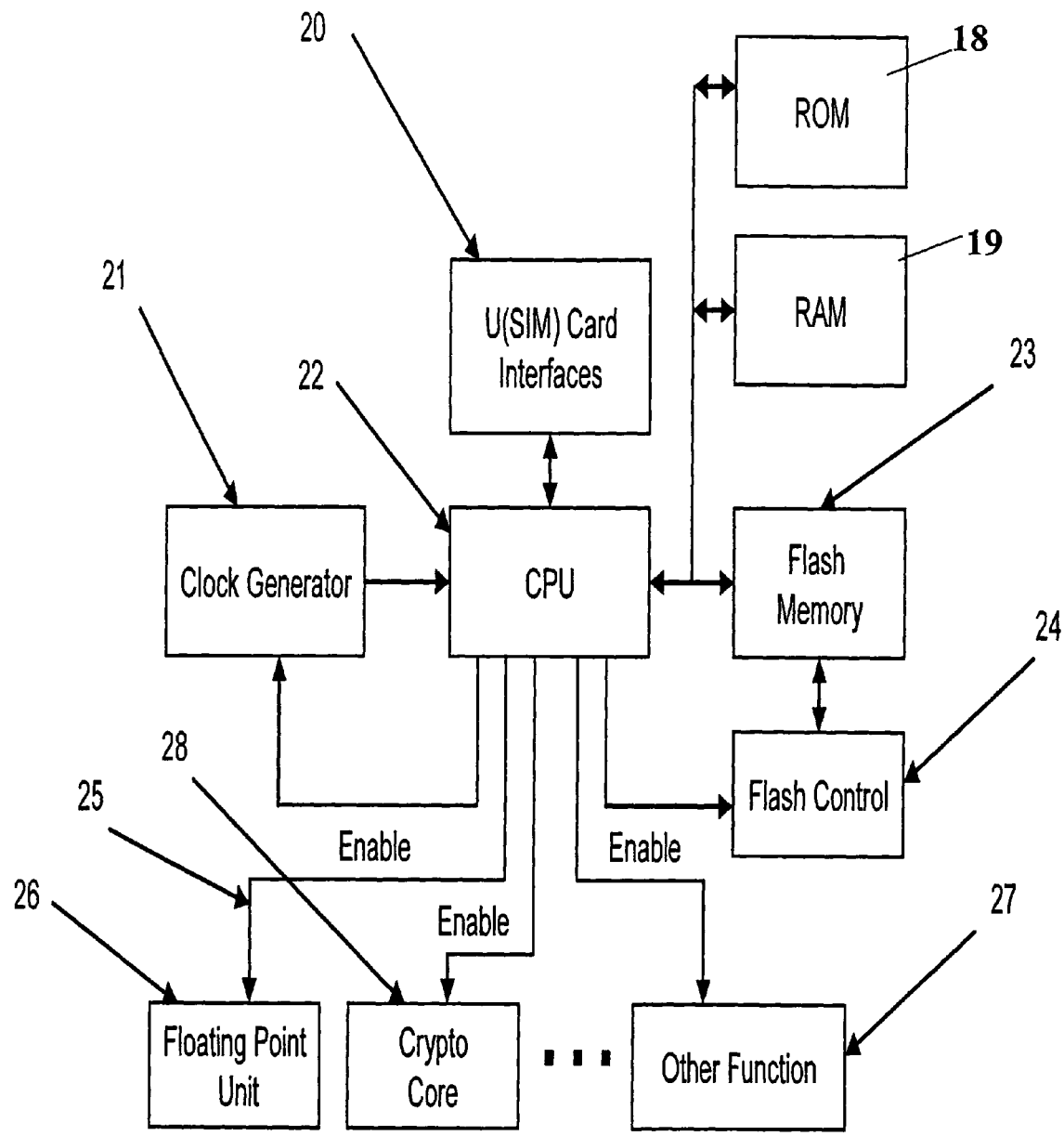
FIG. 2 illustrates an exemplary architecture of an advanced smartcard in accordance with some embodiments of the present invention.

FIG. 2 illustrates an exemplary smartcard with a controller including a CPU (22) and auxiliary memory such as RAM (18) and/or ROM (19). The controller is operative to execute smartcard commands, and the controller is further operative to manage power or current consumption in accordance with some embodiments of the present invention. A programmable clock generation circuitry (21) generates the CPU clock according to any existing programmable clock generation technology (such as a frequency divider, phase locked loop (PLL), or other type of programmable clock-generating hardware). At power up, the clock-generation circuitry is initialized so the CPU (22) draws minimal current. This is achieved by setting the CPU (22) clock to a low frequency; ensuring that the card's current consumption is below the limit defined by the 3GPP specifications. After power-up, if the appropriate command is received via the (U)SIM card interface (20), the CPU (22) may adjust its clock to a higher frequency resulting in enhanced performance at the cost of higher current or power consumption. The adjustment may last only for a limited amount of time in order to perform a specific function, or alternatively may be ongoing as a new operating configuration.

The current drawn by the flash memory (23) may also be programmed via the flash control block (24). For example, by powering up or down sections of the flash memory, it is possible to further control the power consumption of the (U)SIM card. If the (U)SIM card is installed in a mobile device that limits the amount of current provided by the mobile device, the (U)SIM card will use only a fraction of the available memory capacity. In accordance with smartcard power management, the balance of the memory may be disabled (turned off so it will not draw any current) by the controller in order to reduce power consumption. The full memory capacity will be made available to mobile devices that have the capability to manage the (U)SIM card current consumption and can provide the extra amount of current required to operate all of the memory on the card.

As illustrated in FIG. 2, other functional blocks (27) within the (U)SIM card may also be powered on or off to provide or disable added functionality at the cost of increased current.

Examples of functional blocks that can be cycled on and off include the floating-point arithmetic unit (26) and the hardware-based cryptographic core (28). In one example related to FIG. 2, the floating-point arithmetic unit (26) is disabled by default in order to limit the (U)SIM card current consumption. When the (U)SIM card is used in an enhanced terminal capable of delivering more current, the card's floating-point arithmetic unit can be enabled, resulting in enhanced performance when executing applications that require intensive mathematical calculations.

Another exemplary functional block illustrated in FIG. 2 is the hardware-based cryptographic core (28). According to one example, this functional block is disabled when the (U)SIM card is powered on. Legacy devices that contain a (U)SIM card may perform cryptographic functions in software, but devices capable of providing more power to the (U)SIM card may activate the hardware based cryptographic core (28) resulting in enhanced performance when executing the cryptographic functions.

Figure 3:
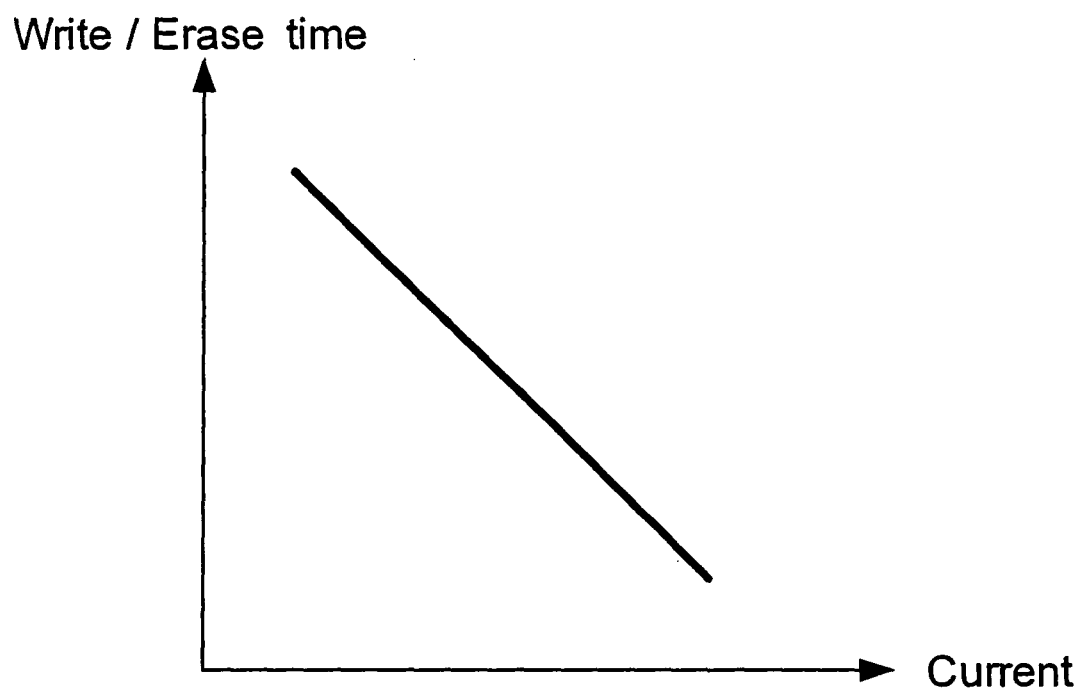
FIG. 3 illustrates an exemplary relation between a flash memory write or erase time and a current supplied to the flash memory.

According to some embodiments, a write and/or erase time of a flash memory (23) is related to the amount of current drawn by the flash memory (23). FIG. 3 illustrates an exemplary such relation, though it will be appreciated that the specific form presented in FIG. 3 is merely provided as an example and is by no means limiting. Thus, according to some embodiments, the amount of current supplied to flash memory (23), and concomitantly a write and/or erase time of the flash memory (23) is managed by controller of the device such as a (U)SIM card controller. This mechanism can be implemented dynamically, where the controller sets the write/erase speed of flash memory (23) in accordance with the maximum amount of current or power the smartcard device can draw.

Figure 4:
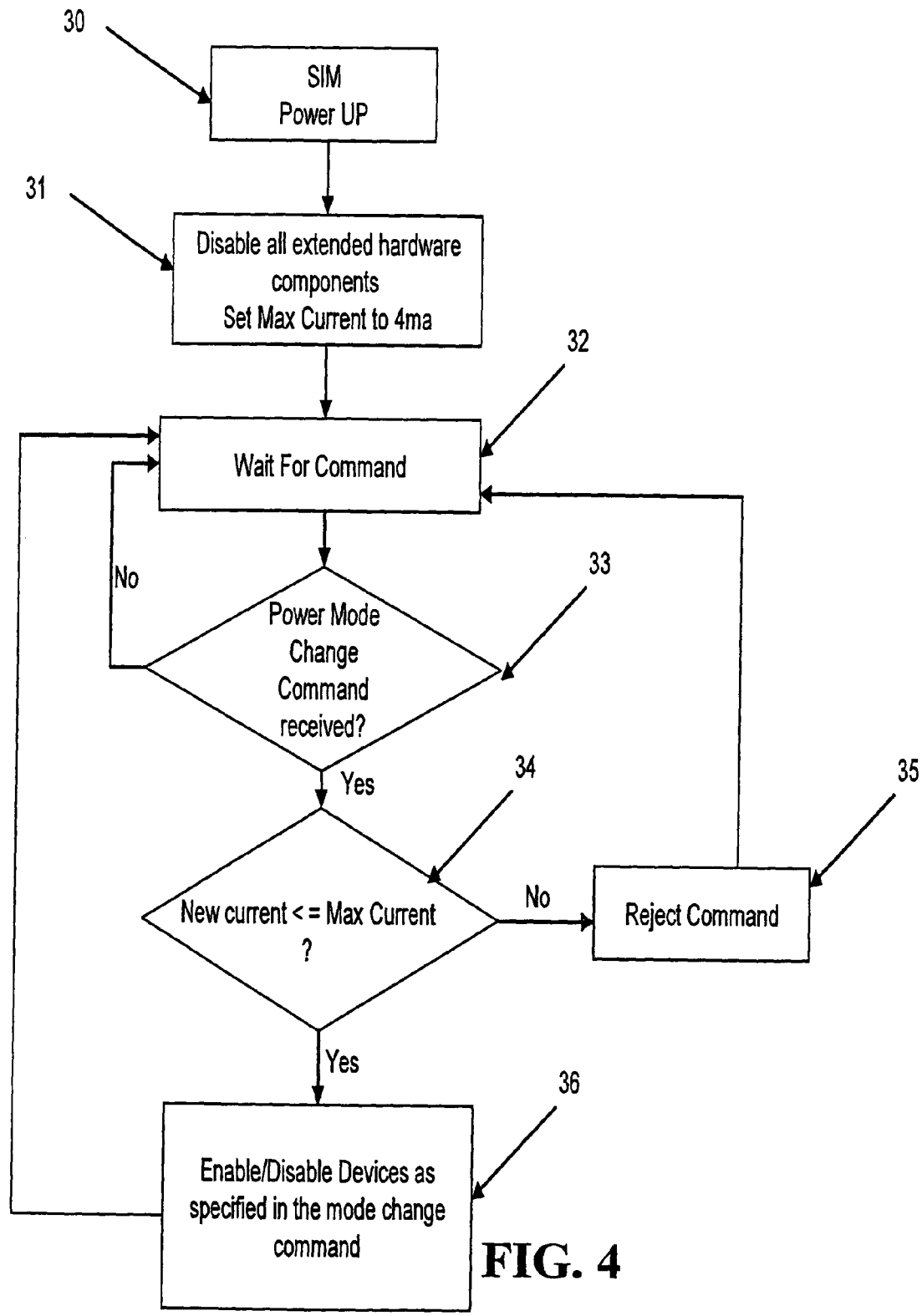
FIG. 4 illustrates an exemplary power control routine of a (U)SIM card.

FIG. 4 illustrates an exemplary power control routine of a (U)SIM card. After applying power to the (U)SIM card (30), all extended components are disabled (31). At this point, the (U)SIM card is set to a mode where its current consumption is minimal and in full compliance with the 3GPP GSM 11.8 maximum current definition. The maximum amount of allowed power or current is saved as a parameter within the (U)SIM card and can be changed later if an appropriate command is delivered via the (U)SIM card interface. After the initialization process, the CPU (22) waits for a command. A "Power Mode Change" command (33) denotes any type of command that results in activating a disabled function, deactivating an enabled function, or changing the performance of the CPU (22) or any other circuitry that results in power consumption change. Upon receiving such a command, the (U)SIM changes its operating mode to one with higher or lower current consumption, which results in enhanced or reduced (U)SIM functionality, respectively.

Existing mobile terminals that are not capable of supporting the higher power requirements required for advanced (U)SIM card features operate the (U)SIM card in basic legacy mode; enhanced mobile devices can take advantage of the full advanced (U)SIM card functionality.

One exemplary command mode change, as demonstrated in FIG. 4, instructs the card to activate a disabled function; upon receiving this type of command the card verifies the new current against the maximum allowed current (34). If the new current is below the maximum allowed current, the command is accepted and the requested function is enabled (36). Otherwise, the command is rejected (35) and an appropriate error response is generated.

Figure 5:
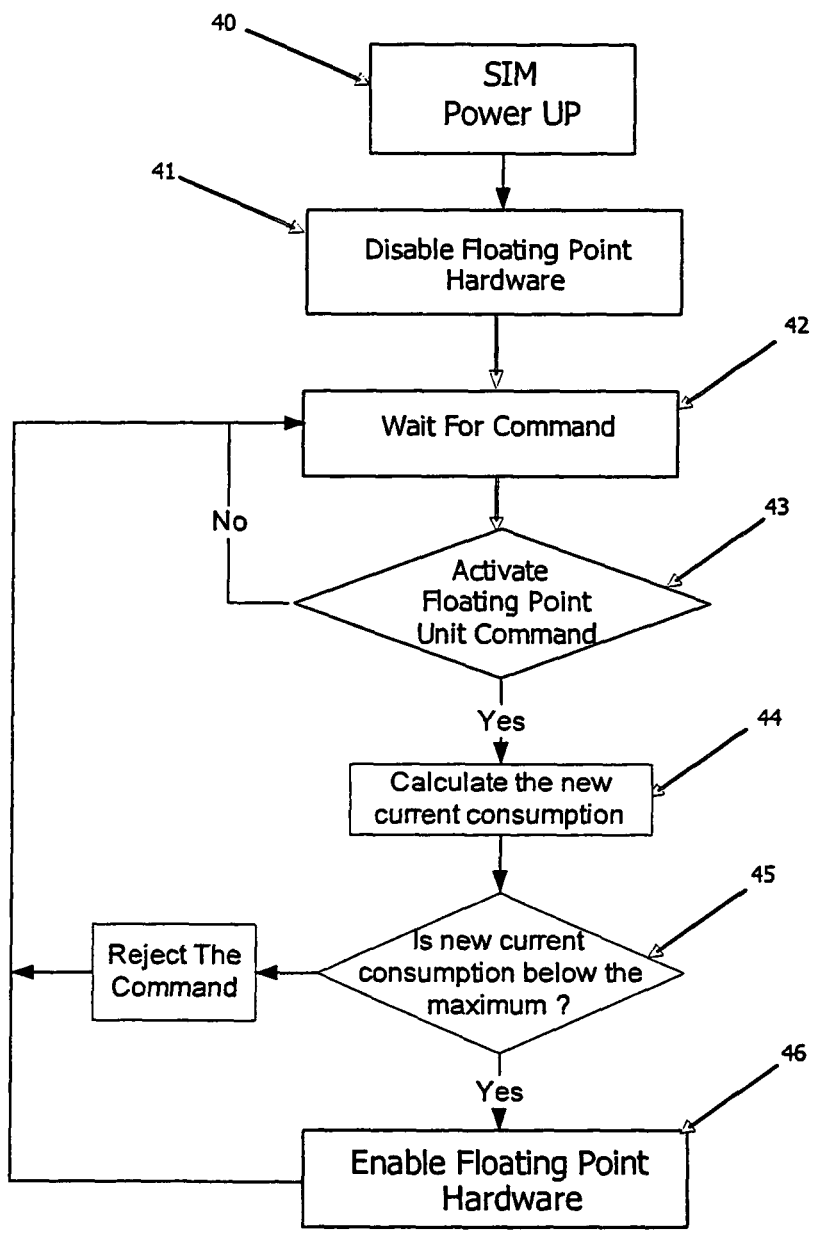
FIG. 5 demonstrates an exemplary routine for the activation of a floating-point unit.

FIG. 5 demonstrates the activation of a floating-point unit (26). Initially, on power up (40) the floating-point unit is disabled (41) to draw minimum current. As soon as the (U)SIM card processor receives a floating-point activation command (42), the card's firmware calculates (43) the updated smartcard current or power consumption after the activation of the floating-point unit (44). This may be performed, for example, by accessing a table that contains the power consumption for each power-controlled device. If the new current is below the maximum allowed current (45), the firmware sends power to and activates the internal floating-point unit (46). From that moment, an application executed by the internal (U)SIM card processor can take advantage of the extended performance provided by the hardware-based floating-point unit.

Figure 6:
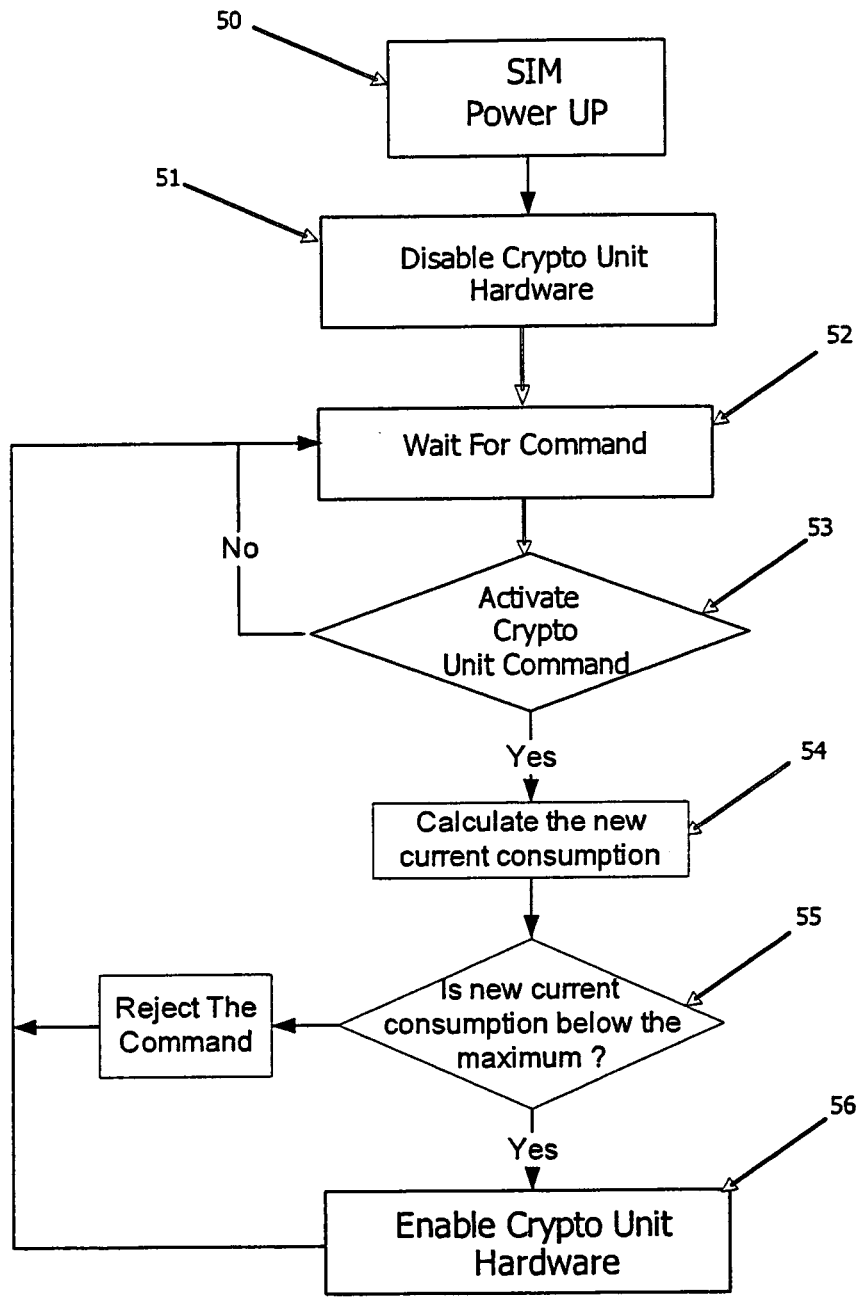
FIG. 6 demonstrates an exemplary routine for the activation of a hardware-based cryptographic unit.

FIG. 6 demonstrates similar functionality, but for a hardware-based cryptographic unit (25). Upon power up (50), the cryptographic unit is initially disabled (51). When a cryptographic unit initialization command is received (52), the (U)SIM card processor calculates (53) the new current consumption after the activation (54) of the cryptographic unit. If the new current is below the maximum allowed current (55), the cryptographic unit is turned on (56). From that moment, an application can use the hardware based cryptographic unit to expedite the execution of applications using cryptography.

Figure 7:
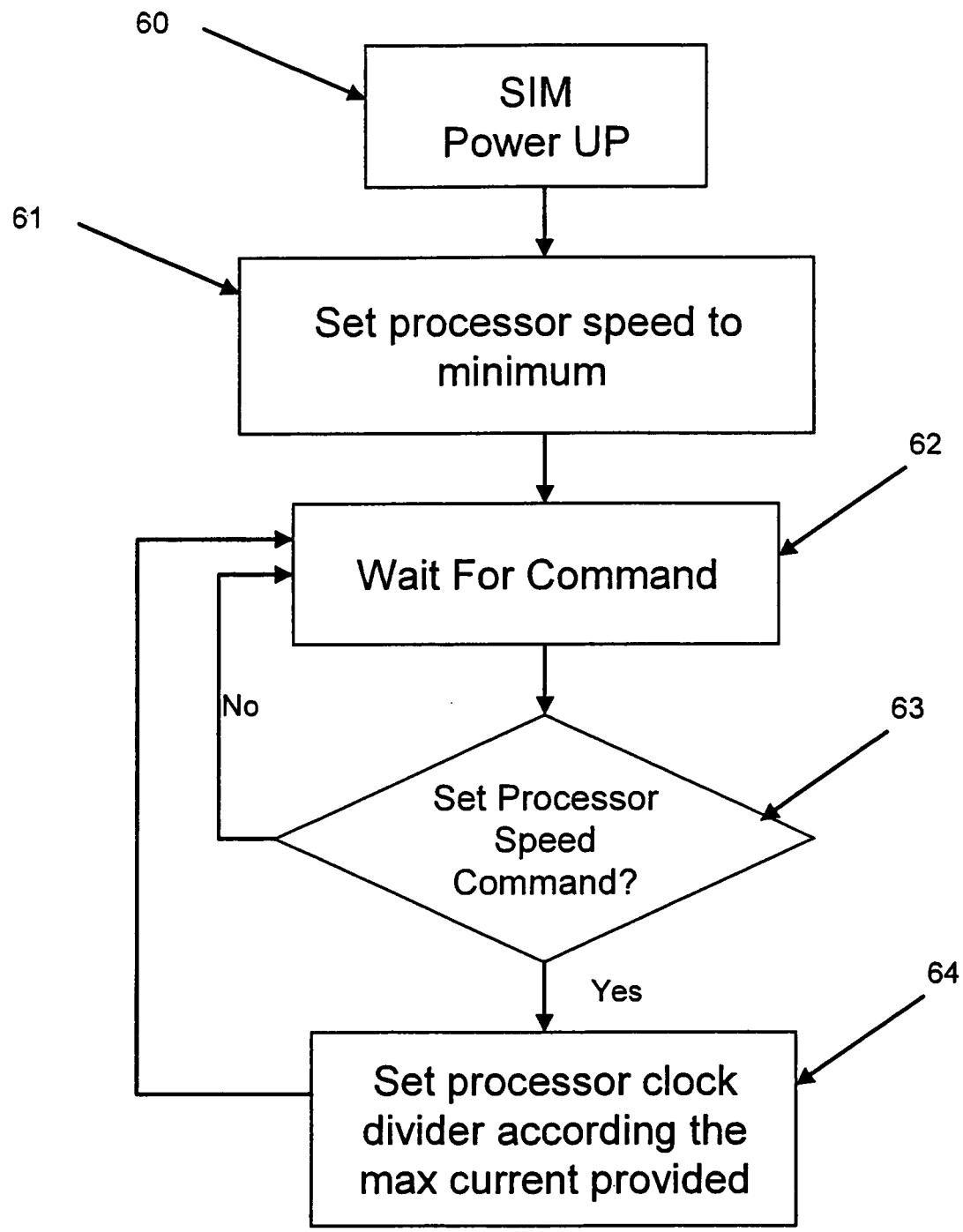
FIG. 7 demonstrates an exemplary power management routine where a processor speed is set according to a maximum allowed current.

FIG. 7 demonstrates another exemplary power management routine where the processor speed is set according to the maximum allowed current. The card is initialized (60) at a minimum speed (61) that conforms to the default maximum power as defined by the 3GPP specification. The processor waits until a new command (62) is received. If the command is a Set Processor Speed command, the card changes the CPU (22) operating clock speed according to the result of a dedicated function that calculates the maximum processor speed to ensure that current consumption remains below the maximum allowed current. Depending on the specific card implementation, this function may be either an analytical function or a table-driven function.

Although the setting of an operating parameter to regulate the power consumption of the card has been explained in FIG. 7 in terms of clock frequency, it is appreciated that any other parameter of the card can be set in order to regulate the card's power consumption. Furthermore, although the aforementioned power control techniques have been described in terms of (U)SIM cards and compatible terminals, it is appreciated that the principles illustrated in the examples are applicable to any smartcard device.

It is noted that there are variety of exemplary situations in which dynamic adjustment of a power consumption of a smartcard, such as a maximum power consumption of a smartcard, is useful. According to one example, it is desirable to extend an operation time of the terminal battery.

It is noted that there is no specific limitation on how one command affects the power consumption of the smartcard device during subsequent execution of at least one other command. In one particular example, a maximum allowed power consumption of the smartcard device is increased or decreased, and the subsequent executing of the at least one other command is carried out in accordance with the adjusted maximum allowed power consumption. Other examples for how the one command affects the power consumption of the smartcard device include but are not limited to increasing or decreasing minimum power consumption, increasing or decreasing average power consumption, and increasing or decreasing peak power value.

In the description and claims of the present application, each of the verbs, "comprise" "include" and "have", and conjugates thereof, are used to indicate that the object or objects of the verb are not necessarily a complete listing of members, components, elements or parts of the subject or subjects of the verb.

The present invention has been described using detailed descriptions of embodiments thereof that are provided by way of example and are not intended to limit the scope of the invention. The described embodiments comprise different features, not all of which are required in all embodiments of the invention. Some embodiments of the present invention utilize only some of the features or possible combinations of the features. Variations of embodiments of the present invention that are described and embodiments of the present invention comprising different combinations of features noted in the described embodiments will occur to persons of the art. The scope of the invention is limited only by the following claims.

What is claimed is:

1. A method of operating an electronic device, the electronic device configured to receive commands from a host device, the method comprising:
   in the electronic device, performing:
      operating in a first one of operating modes;
      receiving a command from the host device, execution of the command configuring the electronic device in a second one of the operating modes;
      determining an effect of operating in the second one of the operating modes on power consumption of at least a part of the electronic device, the second one of the operating modes is different from the first one of the operating modes in at least one aspect; and
      in response to determining the effect of operating in the second one of the operating modes, determining whether to execute the command in order to configure the electronic device to the second one of operating modes.

2. The method of claim 1, wherein the electronic device is a portable electronic circuit card configured to removably couple with a host device.

3. The method of claim 2, wherein determining the effect of operating in the second one of the operating modes comprises determining a change in the power consumption of at least a part of the electronic device.

4. The method of claim 1, wherein determining the effect of operating in the second one of the operating modes on power consumption of at least a part of the electronic device comprises determining a new current for operation in the second one of the operating modes.

5. The method of claim 4, wherein determining whether to execute the command comprises:
   comparing the new current with a maximum allowable current;
   executing the at least one command if the new current is less than or equal to the maximum allowable current; and
   rejecting the at least one command if the new current is greater than the maximum allowable current.

6. The method of claim 1, wherein determining whether to execute the command comprises rejecting the command if the effect on the power consumption of execution of the command is greater than a predetermined amount.

7. The method of claim 1, wherein the command comprises a cryptographic activation command.

8. The method of claim 7, wherein the electronic device comprises a cryptographic core; and
   wherein the cryptographic core is activated if it is determined to execute the cryptographic activation command.

9. The method of claim 1, wherein the command comprises a floating-point activation command.

10. The method of claim 9, wherein the electronic device comprises a floating point unit; and
    wherein the floating point unit is activated if it is determined to execute the floating-point activation command.

11. The method of claim 1, wherein the command comprises a set processor speed command.

12. The method of claim 1, wherein determining whether to execute the command comprises selecting the first one of the operating modes or the second one of the operating modes in order to constrain the power consumption below a predetermined value.

13. The method of claim 1, wherein determining the effect of operating in the second one of the operating modes comprises estimating the power consumption in the second one of the operating modes prior to configuration of the electronic device in the second one of the operating modes.

14. The method of claim 1, wherein determining the effect of operating in the second one of the operating modes comprises determining an effect on minimum power consumption.

15. The method of claim 14, wherein determining an effect on minimum power consumption comprises determining whether the minimum power consumption increases or decreases.

16. The method of claim 1, wherein determining the effect of operating in the second one of the operating modes comprises determining an effect on average power consumption.

17. The method of claim 1, wherein determining the effect of operating in the second one of the operating modes comprises determining an effect on peak power consumption.

18. The method of claim 1, wherein the electronic device comprises a portable electronic peripheral device.

19. The method of claim 18,
    wherein determining the effect of operating in the second one of the operating modes comprises determining a change in the power consumption in operating in the second one of the operating modes.

20. A electronic device, comprising:
    electronics circuit; and
    circuitry operatively coupled to the electronics circuit and configured to receive commands from a host device,
    the electronics circuit having a first one of operating modes and a second one of the operating modes that each execute operating commands received through the circuitry but with different non-zero values of power being consumed in doing so, the second one of the operating modes is different from the first one of the operating modes in at least one aspect,
    wherein the electronic device is configured to:
       operate the electronic device in the first one of operating modes;
       receive through the circuitry a command from the host device, execution of the command configuring the electronics circuit in a second one of the operating modes;
       determine an effect of operating in the second one of operating modes on power consumption of at least a part of the electronic device; and
       in response to determining the effect of operating in the second one of the operating modes, determine whether to execute the command in order to configure the electronics circuit to the second one of operating modes.

21. The electronic device of claim 20, wherein the electronic device is a portable electronic circuit card configured to removably couple with a host device.

22. The electronic device of claim 21,
wherein the electronic device is configured to determine the effect of operating in the second one of the operating modes by determining a change in the power consumption of at least a part of the electronic device.

23. The electronic device of claim 20, wherein the electronic device is configured to determine the effect of operating in the second one of the operating modes on power consumption by determining a new current for operation in the second one of the operating modes.

24. The electronic device of claim 23, wherein the electronic device is configured to determine whether to execute the command by:
comparing the new current with a maximum allowable current;
executing the command if the new current is less than or equal to the maximum allowable current; and
rejecting the command if the new current is greater than the maximum allowable current.

25. The electronic device of claim 20, wherein the electronic device is configured to determine whether to execute the command by rejecting the command if the affect on the power consumption of execution of the command is greater than a predetermined amount.

26. The electronic device of claim 20, wherein the command comprises a cryptographic activation command.

27. The electronic device of claim 26, wherein the electronics circuit comprises a cryptographic core; and
wherein the electronic device is configured to activate the cryptographic core if it is determined to execute the cryptographic activation command.

28. The electronic device of claim 20, wherein the command comprises a floating-point activation command.

29. The electronic device of claim 28, wherein the electronics circuit comprises a floating point unit; and
wherein the electronic device is configured to activate the floating point unit if it is determined to execute the floating-point activation command.

30. The electronic device of claim 20, wherein the command comprises a set processor speed command.

31. The electronic device of claim 20, wherein the electronic device is configured to determine whether to execute the command by selecting the first one of the operating modes or the second one of the operating modes in order to constrain the power consumption below a predetermined value.

32. The electronic device of claim 20, wherein the electronic device is configured to determine the effect of operating in the second one of the operating modes by estimating the power consumption in the second one of the operating modes prior to configuration of the electronic device in the second one of the operating modes.

33. The electronic device of claim 20, wherein the electronic device is configured to determine the effect of operating in the second one of the operating modes by determining an effect on minimum power consumption.

34. The electronic device of claim 33, wherein the electronic device is configured to determine an effect on minimum power consumption by determining whether the minimum power consumption increases or decreases.

35. The electronic device of claim 20, wherein the electronic device is configured to determine the effect of operating in the second one of the operating modes by determining an effect on average power consumption.

36. The electronic device of claim 20, wherein the electronic device is configured to determine the effect of operating in the second one of the operating modes by determining an effect on peak power consumption.

37. The electronic device of claim 20, wherein the electronic device comprises a portable electronic peripheral device.

38. The electronic device of claim 37,
wherein the electronic device is configured to determine the effect of operating in the second one of the operating modes by determining a change in the power consumption in operating in the second one of the operating modes.

* * * * *